US010581104B2

(12) United States Patent
Melough et al.

(10) Patent No.: US 10,581,104 B2
(45) Date of Patent: Mar. 3, 2020

(54) FLOW BATTERIES HAVING A PRESSURE-BALANCED ELECTROCHEMICAL CELL STACK AND ASSOCIATED METHODS

(71) Applicant: Lockheed Martin Energy, LLC, Bethesda, MD (US)

(72) Inventors: Andrew Joseph Melough, Somerville, MA (US); Jeremy Loretz, Boston, MA (US); Srivatsava Venkataranga Puranam, Cambridge, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 78 days.

(21) Appl. No.: 15/469,430

(22) Filed: Mar. 24, 2017

(65) Prior Publication Data

US 2018/0277875 A1  Sep. 27, 2018

(51) Int. Cl.
  *H01M 8/18* (2006.01)
  *H01M 8/2483* (2016.01)
  *H01M 8/04186* (2016.01)

(52) U.S. Cl.
  CPC ....... *H01M 8/188* (2013.01); *H01M 8/04186* (2013.01); *H01M 8/2483* (2016.02); *Y02E 60/528* (2013.01)

(58) Field of Classification Search
  CPC ........................ H01M 8/04276; H01M 8/188
  See application file for complete search history.

(56) References Cited

U.S. PATENT DOCUMENTS 3,779,813 A  12/1973 Rabut
4,075,401 A   2/1978 Miyagawa
(Continued)

FOREIGN PATENT DOCUMENTS

CN      103187551 A    7/2013
DE  10-2011-120802 A   6/2013
(Continued)

OTHER PUBLICATIONS

Hollandsworth, et al., "Zinc/Ferricyanide Battery Development Phase IV," U.S. Department of Energy Report for Contract DE-AC04-76DP00789, May 1985, 278 pages.
(Continued)

*Primary Examiner* — Stewart A Fraser
*Assistant Examiner* — Victoria H Lynch
(74) *Attorney, Agent, or Firm* — BakerHostetler

(57) ABSTRACT

Electrolyte solution circulation rates in a flow battery can impact operating performance. Although adjusting the circulation rates can allow improved performance to be realized, it can be difficult to levelize circulation rates over multiple electrochemical cells of an electrochemical cell stack due to a non-uniform pressure drop that occurs at an outlet of each electrochemical cell. Accordingly, flow batteries capable of realizing improved operating performance can include: an electrochemical cell stack containing a plurality of electrochemical cells in electrical communication with one another; an inlet manifold containing an inflow channel fluidically connected to an inflow side of each of the electrochemical cells; an outlet manifold containing an outflow channel fluidically connected to an outflow side of each of the electrochemical cells; and an insert disposed in the outflow channel. The insert has a variable width along a length of the outflow channel.

8 Claims, 10 Drawing Sheets

(56) References Cited

U.S. PATENT DOCUMENTS

| | | | |
|---|---|---|---|
| 4,532,193 | A | 7/1985 | Kniazzeh et al. |
| 4,735,872 | A | 4/1988 | Maimoni |
| 4,902,589 | A | 2/1990 | Dahn et al. |
| 4,948,681 | A | 8/1990 | Zagrodnik et al. |
| 5,188,911 | A | 2/1993 | Downing et al. |
| 5,618,641 | A | 4/1997 | Arias |
| 5,637,416 | A | 6/1997 | Yoshii et al. |
| 5,665,212 | A | 9/1997 | Zhong et al. |
| 6,296,746 | B1 | 10/2001 | Broman et al. |
| 7,229,564 | B2 | 6/2007 | Liu et al. |
| 8,268,475 | B2 | 9/2012 | Tucholski |
| 8,268,511 | B2 | 9/2012 | Mekala et al. |
| 9,443,782 | B1 | 9/2016 | Steimle et al. |
| 2003/0087141 | A1 | 5/2003 | Sun et al. |
| 2003/0087156 | A1 | 5/2003 | Broman et al. |
| 2003/0099884 | A1 | 5/2003 | Chiang et al. |
| 2004/0131916 | A1 | 7/2004 | Hodge et al. |
| 2004/0191623 | A1 | 9/2004 | Kubata et al. |
| 2004/0224190 | A1 | 11/2004 | Sasahara et al. |
| 2004/0233616 | A1 | 11/2004 | Arai et al. |
| 2005/0098435 | A1 | 5/2005 | Jacobson et al. |
| 2005/0158615 | A1 | 7/2005 | Samuel et al. |
| 2005/0260473 | A1 | 11/2005 | Wang |
| 2006/0068265 | A1 | 3/2006 | Hanlon et al. |
| 2007/0037037 | A1 | 2/2007 | Nguyen et al. |
| 2007/0054175 | A1 | 3/2007 | Maendle et al. |
| 2007/0125493 | A1 | 6/2007 | Jang et al. |
| 2007/0227654 | A1 | 10/2007 | Liu et al. |
| 2007/0287047 | A1 | 12/2007 | Kaiser et al. |
| 2008/0038622 | A1 | 2/2008 | Valensa et al. |
| 2008/0142152 | A1 | 6/2008 | Debe et al. |
| 2008/0152839 | A1 | 6/2008 | Han et al. |
| 2008/0291027 | A1 | 11/2008 | Lake |
| 2008/0305385 | A1 | 12/2008 | Smiljanich et al. |
| 2008/0318110 | A1 | 12/2008 | Budinski et al. |
| 2010/0003545 | A1 | 1/2010 | Horne et al. |
| 2010/0047650 | A1 | 2/2010 | Iino et al. |
| 2010/0291442 | A1 | 11/2010 | Wang et al. |
| 2011/0223450 | A1 | 9/2011 | Horne et al. |
| 2011/0244277 | A1 | 10/2011 | Gordon, II et al. |
| 2012/0040254 | A1 | 2/2012 | Amendola et al. |
| 2012/0258345 | A1 | 10/2012 | Zaffou et al. |
| 2012/0328910 | A1* | 12/2012 | la O' ................ H01M 8/04186 429/51 |
| 2013/0037760 | A1 | 2/2013 | Maeda et al. |
| 2013/0071714 | A1 | 3/2013 | Perry et al. |
| 2013/0095361 | A1 | 4/2013 | Sinsabaugh et al. |
| 2013/0157097 | A1 | 6/2013 | Kampanatsanyakorn et al. |
| 2013/0266829 | A1 | 10/2013 | Cole et al. |
| 2014/0051007 | A1 | 2/2014 | Blanchet et al. |
| 2014/0093804 | A1* | 4/2014 | Kreiner ............ H01M 8/04276 429/455 |
| 2014/0234734 | A1 | 8/2014 | Tsutsumi et al. |
| 2014/0308594 | A1 | 10/2014 | Dudney et al. |
| 2014/0349147 | A1 | 11/2014 | Shaffer, II et al. |
| 2014/0370404 | A1 | 12/2014 | Kato et al. |
| 2015/0079493 | A1 | 3/2015 | Guthrie |
| 2015/0099199 | A1 | 4/2015 | Bazant et al. |
| 2015/0136301 | A1 | 5/2015 | Cyman, Jr. et al. |
| 2016/0020477 | A1 | 1/2016 | Smeltz et al. |
| 2016/0036060 | A1 | 2/2016 | Brezovec |
| 2016/0133964 | A1* | 5/2016 | Darling ................ H01M 8/188 429/50 |
| 2016/0240868 | A1 | 8/2016 | Warrington et al. |
| 2016/0308224 | A1 | 10/2016 | Morris-Cohen et al. |
| 2017/0054164 | A1 | 2/2017 | Goeltz et al. |
| 2017/0222246 | A1* | 8/2017 | Kreiner ............... H01M 8/0258 |

FOREIGN PATENT DOCUMENTS

| | | |
|---|---|---|
| JP | H-06-290795 | 10/1994 |
| JP | 2001-283879 A | 10/2001 |
| JP | 2005-228633 A | 8/2005 |
| JP | 2008-047313 A | 2/2008 |
| JP | 2008-078104 A | 4/2008 |
| JP | 2008-091110 A | 4/2008 |
| JP | 2008-166260 A | 7/2008 |
| JP | 2011-228059 A | 11/2011 |
| JP | 2012-252955 A | 12/2012 |
| JP | 2014-520382 A | 8/2014 |
| WO | WO-00/16418 A1 | 3/2000 |
| WO | WO-2010/033118 A1 | 3/2010 |
| WO | WO-2012/177255 A1 | 12/2012 |

OTHER PUBLICATIONS

Ma et al., "High-performance supercapacitor electrodes based on porous flexible carbon nanofiber paper treated by surface chemical etching," Chemical Engineering Journal, Aug. 2014.

McCreery, "Advanced Carbon Electrode Materials for Molecular Electrochemistry," Chem Rev, 2008, pp. 2646-2687, vol. 108.

Sen, et al., "Metal-Air Battery Assessment," U.S. Department of Energy Report for Contract DE-AC06-76RLO1830, May 1988, 84 pages.

Soloveichik, "Flow Batteries: Current Status and Trends," 2015, Chem. Rev., 115 (20), pp. 11533-11558.

Extended European Search Report from European Patent Application No. 14845729.4, dated May 8, 2017.

International Search Report and Written Opinion from PCT/US2017/030452, dated Jul. 3, 2017.

Japanese Office Action from 2016-544047, dated Jul. 3, 2018, 11 pages.

* cited by examiner

FLOW BATTERIES HAVING A PRESSURE-BALANCED ELECTROCHEMICAL CELL STACK AND ASSOCIATED METHODS

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to methods and systems configured for regulating circulation of an electrolyte solution through an electrochemical cell stack of a flow battery.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The terms "membrane" and "separator" are used synonymously herein. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery or like electrochemical energy storage system (i.e., during charging or discharging). Although flow batteries hold significant promise for large-scale energy storage applications, they have often been plagued by sub-optimal energy storage performance (e.g., round trip energy efficiency) and limited cycle life, among other factors. Despite significant investigational efforts, no commercially viable flow battery technologies have yet been developed.

The operating performance of flow batteries can be impacted by a number of factors including, for example, state of charge (SOC), operating temperature, age of the flow battery and its components, electrolyte circulation rates, power and current conditions, and the like. As used herein, the term "state of charge" (SOC) refers to the relative amounts of reduced and oxidized active material species at an electrode within a given half-cell of a flow battery or other electrochemical system at a particular operation time. In many cases, the foregoing factors are not independent of one another, which can make performance optimization very difficult. Effective regulation of circulation rates throughout a flow battery is one particular factor that has been especially problematic to address and has contributed to their present lack of commercial viability.

In view of the foregoing, flow batteries and associated methods configured to promote more effective circulation of an electrolyte solution would be highly desirable in the art. The present disclosure satisfies the foregoing needs and provides related advantages as well.

SUMMARY

In various embodiments, the present disclosure provides flow batteries including: an electrochemical cell stack containing a plurality of electrochemical cells in electrical communication with one another; an inlet manifold containing an inflow channel fluidically connected to an inflow side of each of the electrochemical cells; an outlet manifold containing an outflow channel fluidically connected to an outflow side of each of the electrochemical cells; and an insert disposed in the outflow channel. The insert has a variable width along a length of the outflow channel.

In other various embodiments, methods for operating a flow battery are also disclosed herein. The methods can include: providing a flow battery containing: an electrochemical cell stack containing a plurality of electrochemical cells in electrical communication with one another; an inlet manifold containing an inflow channel fluidically connected to an inflow side of each of the electrochemical cells; and an outlet manifold containing an outflow channel fluidically connected to an outflow side of each of the electrochemical cells; placing an insert in the outflow channel; and circulating an electrolyte solution through the electrochemical cell stack via the inlet manifold and the outlet manifold. The insert has a variable width along a length of the outflow channel.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
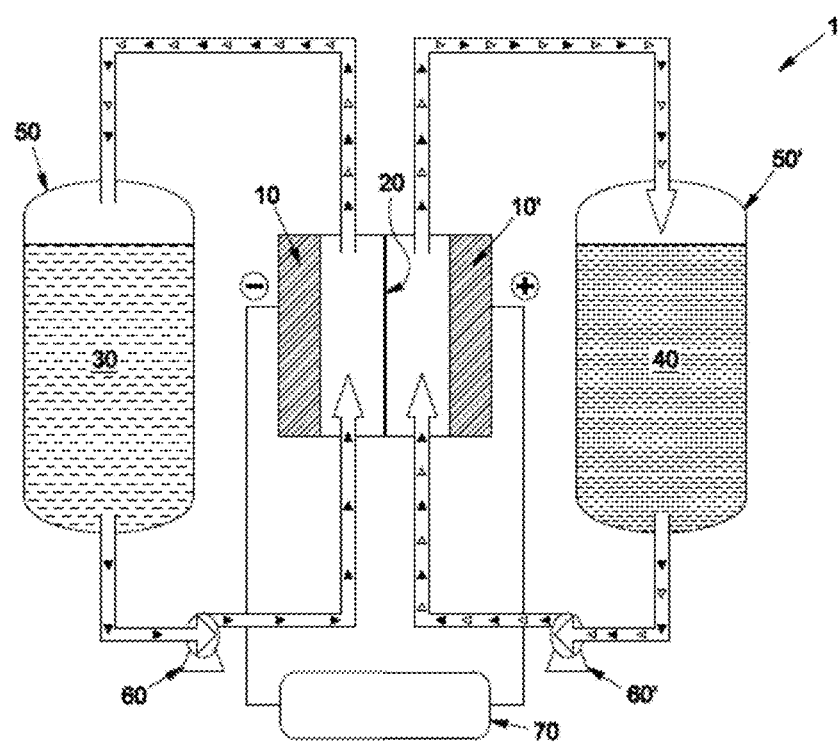
FIG. 1 depicts a schematic of an illustrative flow battery containing a single electrochemical cell.

The present disclosure is directed, in part, to flow batteries configured for regulating electrolyte solution circulation through an electrochemical cell stack. The present disclosure is also directed, in part, to methods for regulating electrolyte solution circulation through an electrochemical cell stack.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating performance. Exemplary description of illustrative flow batteries, their use, and operating characteristics, as well as ways in which the flow battery structure and operating conditions can be modified to improve performance, are provided hereinbelow.

A number of parameters can impact the operating performance of a given flow battery, and in many cases these parameters are interdependent upon one another. The circulation rates of the electrolyte solutions in a flow battery can particularly impact operating performance. Ineffective circulation rates, either too fast or too slow, can lead to poor energy efficiency values, for example. Present flow battery designs can contribute to a difficulty in regulating circulation rates of the electrolyte solutions, as explained hereinafter.

Figure 4:
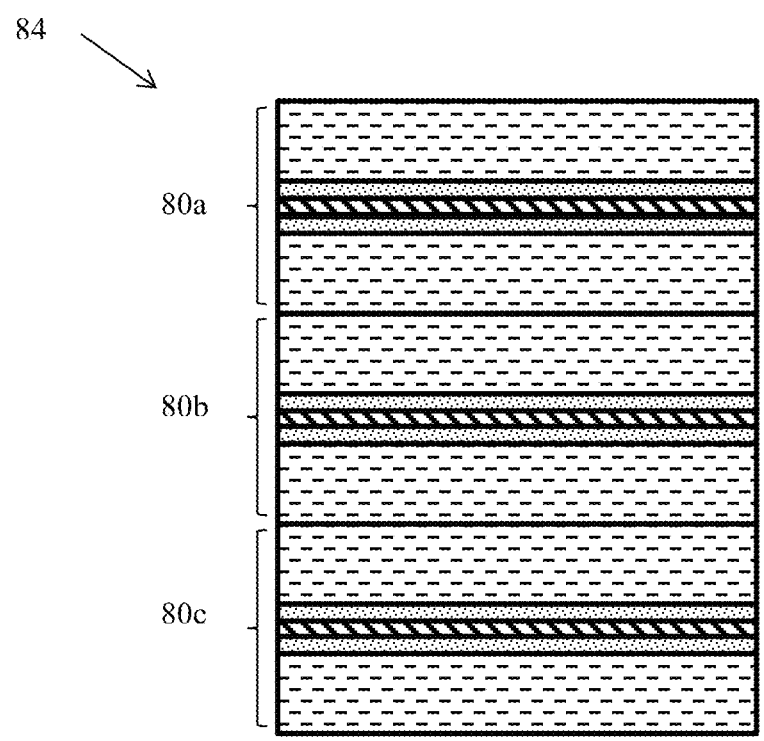
FIG. 4 shows a generalized schematic of an illustrative electrochemical cell stack containing the electrochemical cell of FIG. 2.
Figure 5:
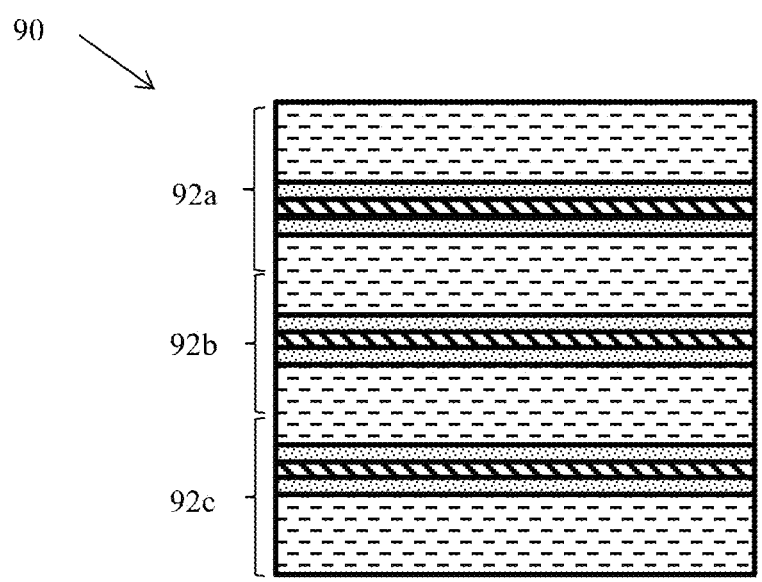
FIG. 5 shows a generalized schematic of an illustrative electrochemical cell stack having shared bipolar plates between adjacent electrochemical cells.

Flow batteries normally contain a plurality of electrochemical cells disposed in an electrochemical cell stack (i.e., a vertically disposed grouping of abutted electrochemical cells, each containing opposing half-cells divided by a separator—see FIGS. 4 and 5). With present flow battery designs, it can be difficult, if not impossible, to regulate electrolyte solution circulation rates through each electrochemical cell individually. In particular, the electrochemical cells in a vertically disposed electrochemical cell stack experience different back pressures when circulating an electrolyte solution therethrough, thereby leading to different circulation rates in a given electrochemical cell depending upon how much back pressure is present at a given location. In general, the electrochemical cells nearer the location of electrolyte solution introduction and withdrawal experience a different (smaller) pressure drop on their outlet end than do the electrochemical cells that are more remote from the locations of introduction and withdrawal. The variable pressure drop results in differing electrolyte solution circulation rates throughout the individual electrochemical cells of an electrochemical cell stack. Aging or failing components of a flow battery can similarly impact electrolyte solution circulation rates in some cases. As a result of the lack of circulation uniformity, at least some of the electrochemical cells in an electrochemical cell stack can be operating at a less than optimal condition.

The present inventors discovered that by adjusting the back pressure at an outlet end of each electrochemical cell within an electrochemical cell stack, the electrolyte solution circulation rate(s) through the individual electrochemical cells can be made more uniform. More specifically, the inventors discovered that by variably occluding an outflow channel through which the electrolyte solution passes, the back pressure and the electrolyte solution circulation rate can be made more uniform at each electrochemical cell. In the discovery made by the inventors, an insert can be placed in the outflow channel to provide more flow occlusion for some electrochemical cells and less flow occlusion for others. The foregoing can be accomplished by designing the insert to have a variable width along a length of the outflow channel and placing the insert in the outflow channel. In particular, the insert has larger widths at locations in the outflow channel that are more removed from the location of electrolyte solution withdrawal, where a greater back pressure is needed to levelize the circulation rate, and smaller widths at locations nearer the location of withdrawal. More specifically, the insert can be tapered to have an increasing width from the top face to the bottom face of the electrochemical cell stack relative to the locations of electrolyte solution introduction and withdrawal. The tapering can be linear or non-linear, and uniform or non-uniform. Advantageously, these factors can be varied to meet the requirements of a given application.

Flow batteries are most commonly fabricated by combining mass-produced electrochemical cell components together to form an electrochemical cell stack. Mass production allows multiple electrochemical cells to be fabricated relatively inexpensively. Once assembled into an electrochemical cell stack, the electrochemical cell components define an inflow channel and an outflow channel therein, through which an electrolyte solution can be circulated to a particular half-cell of each electrochemical cell. While fabricating electrochemical cell stacks in this manner can allow inexpensive production to take place, it does not allow customization of any feature to be readily realized. Although custom-designed inflow and/or outflow channels could be fabricated to address the difficulties associated with differential pressure drops, doing so would considerably impact manufacturing costs and production rates.

In contrast, by disposing a variable width insert in the outflow channel of an outlet manifold associated with an electrochemical cell, ready customization of the electrolyte solution circulation performance can be more easily realized without significantly increasing the manufacturing complexity and cost. More particularly, the electrochemical cell stack can be fabricated using low-cost, mass-produced electrochemical cell components, and depending upon the pressure profile that is predicted or observed, an insert with a desired design or profile can be selected to modify the pressure features in the outflow channel in a specific way. Even custom-designed inserts with complex shapes do not add significantly to the overall cost once averaged with the mass-produced components.

While the cell components used to fabricate the electrochemical cell stack can be mass-produced, the insert can be made by more customized manufacturing processes, if needed. The insert can be a monolithic structure, or the insert can be assembled from a plurality of modular components to produce an insert having a desired shape. The latter configuration allows a great deal of design flexibility to be realized. In some embodiments, the modular components can be cheaply produced to provide a "toolkit" that is capable of forming an insert having a wide variety of usable shapes. Techniques for affixing the modular components together to form the inset are not considered to be particularly limited.

As an additional benefit of the present disclosure, the insert can further modify the circulation performance in the outflow channel in a desired way. For example, the insert can, in some embodiments, be configured to induce or reduce turbulence in the outflow channel, restrict circulation rates in the outflow channel, or the like.

Moreover, in many instances, the insert can be removably disposed within the outflow channel of the electrochemical cell stack. With the insert being disposed in a removable condition, the operating performance of the flow battery can be evaluated, and the insert can be replaced with a different insert that is capable of inducing one or more differing flow and/or pressure conditions within the outflow channel, if desired. This process can be repeated as many times as necessary to find a set of desired circulation and/or pressure conditions. In addition, if the circulation pathway within the electrochemical cells changes over time (e.g., by becoming partially clogged with deposited active material or other components, thereby increasing the back pressure), the insert can be changed in response to the new pressure conditions.

As still another advantage, the insert can be affixed to a component configured to mate with an outlet of the outflow channel, thereby disposing the insert within the outflow channel upon connecting the component to the outlet. In particular embodiments, the component can be a flange that is operably connected to the outlet, although any suitable component not associated with the electrochemical cell stack can be used to introduce the insert within the outflow channel. As used herein, the term "balance of plant (BOP)" refers to any of the system components of a flow battery that are outside the electrochemical cell stack. By affixing the insert to a flange or other balance of plant component, movement of the insert within the outflow channel can be precluded. In alternative configurations, however, the insert can be affixed within the outlet change through other means, such as through adhesive bonding.

In addition to the foregoing advantages, the insert can be design to mitigate shunt currents within the flow battery system. For example, by decreasing a fluidic cross-section within the outflow channel, the shunt resistance can undergo a corresponding increase. Similarly, by creating isolated flow pathways between individual cells, some of which are longer, shunt currents can be decreased.

Before discussing further specifics of the flow batteries and methods of the present disclosure, illustrative flow battery configurations and their operating characteristics will first be described in greater detail hereinafter.

FIG. 1 depicts a schematic of an illustrative flow battery containing a single electrochemical cell. Although FIG. 1 shows a flow battery containing a single electrochemical cell, approaches for combining multiple electrochemical cells together in an electrochemical cell stack are known and are discussed hereinbelow. Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical cell stack. This design feature decouples the electrical energy storage system power from the energy storage capacity, thereby allowing for considerable design flexibility and cost optimization to be realized.

As shown in FIG. 1, flow battery 1 includes an electrochemical cell that features separator 20 (e.g., a membrane) that separates the two electrodes 10 and 10' of the electrochemical cell. As used herein, the terms "separator" and "membrane" synonymously refer to an ionically conductive and electrically insulating material disposed between the positive and negative electrodes of an electrochemical cell. Electrodes 10 and 10' are formed from a suitably conductive material, such as a metal, carbon, graphite, and the like. Although FIG. 1 has shown electrodes 10 and 10' as being spaced apart from separator 20, electrodes 10 and 10' can also be abutted with separator 20 in more particular embodiments. The material(s) forming electrodes 10 and 10' can be porous, such that they have a high surface area for contacting first electrolyte solution 30 and second electrolyte solution 40, the active materials of which are capable of cycling between an oxidized state and a reduced state during operation of flow battery 1. For example, one or both of electrodes 10 and 10' can be formed from a porous carbon cloth or a carbon foam in particular embodiments.

Pump 60 affects transport of first electrolyte solution 30 containing a first active material from tank 50 to the electrochemical cell. The flow battery also suitably includes second tank 50' that holds second electrolyte solution 40 containing a second active material. The second active material in second electrolyte solution 40 can be the same material as the first active material in first electrolyte solution 30, or it can be different. Second pump 60' can affect transport of second electrolyte solution 40 to the electrochemical cell. Pumps (not shown in FIG. 1) can also be used to affect transport of the first and second electrolyte solutions 30 and 40 from the electrochemical cell back to tanks 50 and 50'. Other methods of affecting fluid transport, such as siphons, for example, can also suitably transport first and second electrolyte solutions 30 and 40 into and out of the electrochemical cell. Also shown in FIG. 1 is power source or load 70, which completes the circuit of the electrochemical cell and allows a user to collect or store electricity during its operation. Connection to the electrical grid for charging or discharging purposes can also occur at this location.

It should be understood that FIG. 1 depicts a specific, non-limiting embodiment of a flow battery. Accordingly, flow batteries consistent with the spirit of the present disclosure can differ in various aspects relative to the configuration of FIG. 1. As one example, a flow battery can include one or more active materials that are solids, gases, and/or gases dissolved in liquids. Active materials can be stored in a tank, in a vessel open to the atmosphere, or simply vented to the atmosphere.

During operation of a flow battery in a charging cycle, one of the active materials undergoes oxidation and the other active material undergoes reduction. In a discharging cycle, the opposite processes occur in each half-cell. Upon changing the oxidation states of the active materials, the chemical potentials of the electrolyte solutions are no longer in balance with one another. To relieve the chemical potential imbalance, dissolved mobile ions migrate through the separator to lower the charge in one electrolyte solution and to raise the charge in the other electrolyte solution. Thus, the mobile ions transfer the charge generated upon oxidizing or reducing the active materials, but the mobile ions themselves are not usually oxidized or reduced. To maintain facile electrode kinetics and to limit the possibility of occluding flow pathways, flow batteries are usually configured such that the mobile ions and the active materials remain continuously dissolved in the electrolyte solutions. By keeping the mobile ions and the active materials continuously dissolved in the electrolyte solutions, potential issues associated with circulating solids can be averted.

As indicated above, multiple electrochemical cells can also be combined with one another in an electrochemical cell stack in order to increase the rate that energy can be stored and released during operation. The amount of energy released is determined by the overall amounts of active materials that are present. An electrochemical cell stack utilizes bipolar plates between adjacent electrochemical cells to establish electrical communication but not fluidic communication between the two cells across the bipolar plate. Thus, bipolar plates contain the electrolyte solutions in an appropriate half-cell within the individual electrochemical cells. Bipolar plates are generally fabricated from electrically conductive materials that are fluidically non-conductive on the whole. Suitable materials can include carbon, graphite, metal, or a combination thereof. Bipolar plates can also be fabricated from non-conducting polymers having a conductive material dispersed therein, such as carbon particles or fibers, metal particles or fibers, graphene, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized that bipolar plates are not necessarily entirely non-porous entities, however. Bipolar plates can have innate or designed flow channels, for example, that provide a greater surface area for allowing an electrolyte solution to contact the bipolar plate. Suitable flow channel configurations can include, for example, interdigitated flow channels (see FIG. 3). In some embodiments, the flow channels can be used to promote delivery of an electrolyte solution to an electrode within the electrochemical cell. Delivery of an electrolyte solution to an electrode via a bipolar plate is discussed in more detail hereinbelow.

An electrolyte solution can be delivered to and withdrawn from each electrochemical cell via an inlet manifold and an outlet manifold (not shown in FIG. 1). In some embodiments, the inlet manifold and the outlet manifold can provide and withdraw an electrolyte solution via the bipolar plates separating adjacent electrochemical cells. Separate inlet manifolds can provide each electrolyte solution individually to the two half-cells of each electrochemical cell. Likewise, separate outlet manifolds withdraw the electrolyte solutions from the positive and negative half-cells. In more particular embodiments, the inlet manifold and the outlet manifold can be configured to supply and withdraw the electrolyte solutions via opposing lateral faces of the bipolar plates (e.g. by supplying and withdrawing the electrolyte solution from opposing ends of the flow channels within the bipolar plate). Thus, the electrolyte solutions circulate laterally through the individual half-cells of the flow battery. Further disclosure is provided hereinbelow regarding how the inlet and outlet manifolds are configured, and particular disclosure is provided showing how the outlet manifold can be modified using an insert.

Figure 2:
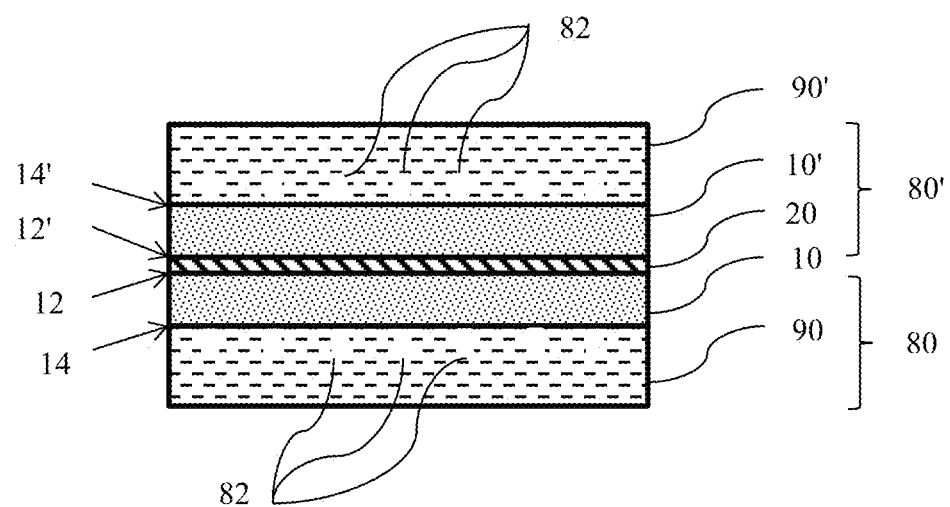
FIG. 2 shows a schematic of an illustrative electrochemical cell containing a bipolar plate abutting each electrode.
Figure 3:
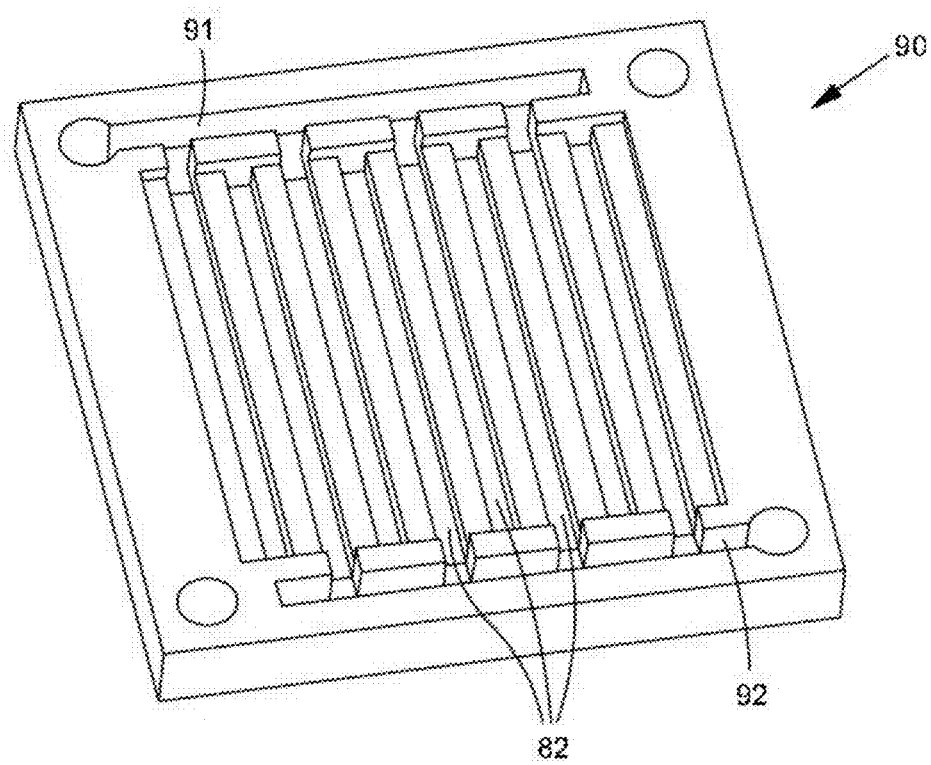
FIG. 3 shows an illustrative schematic of a bipolar plate containing interdigitated flow channels.

FIG. 2 shows a schematic of an illustrative electrochemical cell containing a bipolar plate abutting each electrode. Where appropriate, common reference characters are used herein to describe elements shown in a preceding FIGURE. Referring to FIG. 2, negative half-cell 80 and positive half-cell 80' are disposed on opposing sides of separator 20. Negative half-cell 80 contains electrode 10 (i.e., the anode)

abutted with separator 20 at interface 12, and bipolar plate 90 is, in turn, abutted against the opposing face of electrode 10 at interface 14. Positive half-cell 80' similarly contains electrode 10' (i.e., the cathode) abutted with the opposing face of separator 20 at interface 12', and bipolar plate 90' is, in turn, abutted against the opposing face of electrode 10' at interface 14'. Flow channels 82 extend partially within the interior of bipolar plates 90 and 90' and increase the degree of contact with the electrolyte solution. In some embodiments, flow channels 82 can be in an interdigitated configuration as shown in FIG. 3 below. Other configurations for flow channels include, for example, regular or irregular spacing, random directionality, tortuous interconnected pathways, random distributions and/or gradient distributions. In the interest of clarity, the fluid flow details shown in FIG. 1 are not presented in FIG. 2. However, it can be readily appreciated how the electrochemical cell of FIG. 2 would be incorporated flow battery 1 in FIG. 1, or how a plurality of electrochemical cells would be incorporated in an electrochemical cell stack and connected to inlet and outlet manifolds to deliver and withdraw an electrolyte solution. For example, an inlet manifold can be connected to an inlet side on bipolar plates 90 and 90' to supply an electrolyte solution to electrodes 10 and 10', as shown hereinafter. For purposes of discussion herein, the electrochemical cell of FIG. 2 will be considered representative of that present in a conventional flow battery.

FIG. 3 shows an illustrative schematic of a bipolar plate containing interdigitated flow channels. As shown in FIG. 3, bipolar plate 90 includes inflow channel 91 as part of an inlet manifold which provides electrolyte solution to bipolar plate 90, and outflow channel 92 as part of an outlet manifold which withdraws electrolyte solution from bipolar plate 90. Flow channels 82, which are interdigitated with one another in FIG. 3, are in fluidic communication with inflow channel 91 and outflow channel 92 and supply electrolyte solution to the electrode (not shown in FIG. 3) in a given half-cell. Thus, inflow channel 91 can supply an electrolyte solution to alternating flow channels 82. After interacting with the electrode, the electrolyte solution can then migrate via convective flow to flow channels 82 beside those that were initially filled with the electrolyte solution. At this point, the electrolyte solution can then exit bipolar plate 90 via outflow channel 92.

Accordingly, in various embodiments, flow batteries of the present disclosure can include: an electrochemical cell stack containing a plurality of electrochemical cells in electrical communication with one another, an inlet manifold containing an inflow channel fluidically connected to an inflow side of each of the electrochemical cells, an outlet manifold containing an outflow channel fluidically connected to an outflow side of each of the electrochemical cells, and an insert disposed in the outflow channel. The insert has a variable width along a length of the outflow channel. In more specific embodiments, a width of the insert decreases in a direction configured for circulation of the electrolyte solution in the outflow channel.

FIG. 4 shows a generalized schematic of an illustrative electrochemical cell stack containing the electrochemical cell of FIG. 2. As shown in FIG. 4, electrochemical cells 80a, 80b and 80c are abutted against one another in electrochemical cell stack 84, such that electrical communication is established through their abutted bipolar plates. In alternative configurations, electrochemical cell stacks can also be formed such that they share bipolar plates between adjacent electrochemical cells. FIG. 5 shows a generalized schematic of an illustrative electrochemical cell stack 90 having shared bipolar plates between adjacent electrochemical cells 92a, 92b and 92c. Although the unit cell structure of FIG. 5 differs somewhat from that of FIG. 4, one having ordinary skill in the art can envision how such an electrochemical cell stack can be fabricated by sequentially placing mass-produced components upon one another. In either case, stacking of the mass-produced components produces inlet and outlet manifolds for delivering and withdrawing electrolyte solution, as discussed further hereinafter.

As discussed above, each electrochemical cell of a flow battery includes a negative half-cell and a positive half-cell, which are on opposing sides of an ionically conductive separator or membrane. Each half-cell can have separate inlet and outlet manifolds fluidically connected thereto. That is, in an electrochemical cell stack, a first inlet manifold and a first outlet manifold can supply and withdraw a first electrolyte solution to and from the negative half-cells of the electrochemical cell stack, and a second inlet manifold and a second outlet manifold can supply and withdraw a second electrolyte solution to and from the positive half-cells of the electrochemical cell stack. In the embodiments of the present disclosure, the first outlet manifold, the second outlet manifold, or both the first and second outlet manifolds can have an insert present therein in order to regulate electrolyte solution circulation through the corresponding half-cells.

In more particular embodiments, the inflow channel is configured to supply electrolyte solution through the inlet manifold longitudinally with respect to the plurality of electrochemical cells, the outflow channel is configured to withdraw electrolyte solution though the outlet manifold longitudinally with respect to the plurality of electrochemical cells, and each electrochemical cell is configured to circulate electrolyte solution laterally therethrough. As used herein, the term "longitudinally" refers to a direction that is substantially perpendicular (±10°, for example) to the plane of the individual electrochemical cells in an electrochemical cell stack. As used herein, the term "laterally" refers to a direction that is substantially in-plane within the individual electrochemical cells of an electrochemical cell stack. In still more particular embodiments, the inlet manifold and the outlet manifold are configured, respectively, to supply and withdraw electrolyte solution longitudinally from a single face of the electrochemical cell stack.

Figure 6:
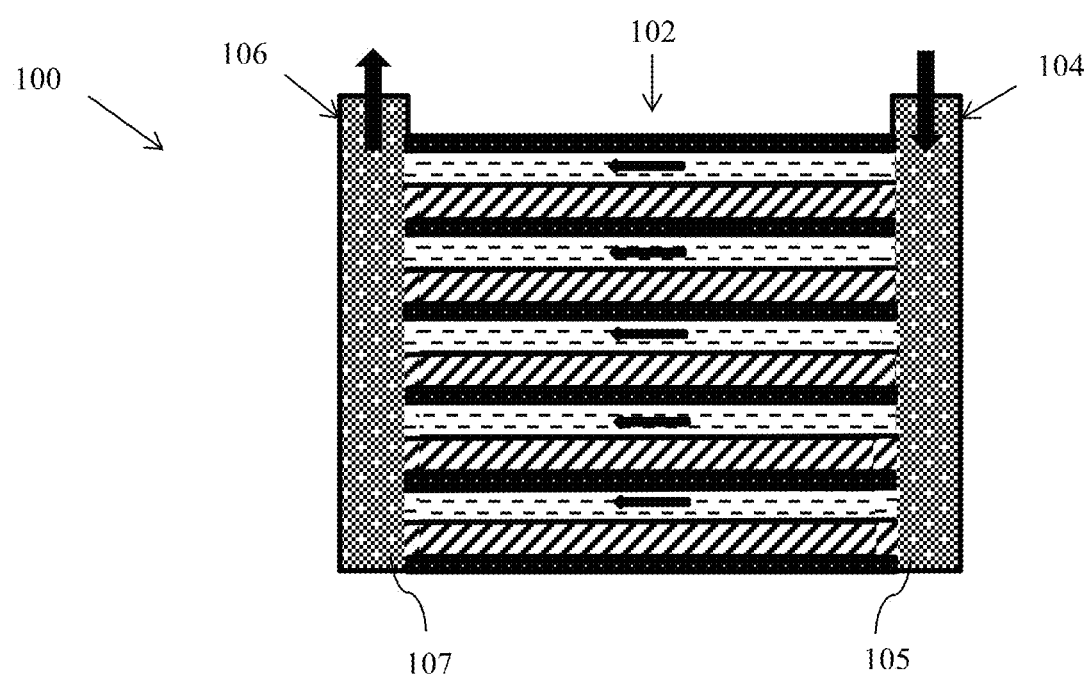
FIG. 6 shows an illustrative schematic of a flow battery containing an electrochemical cell stack with inlet and outlet manifolds that are fluidically connected to alternating half-cells.

FIG. 6 shows an illustrative schematic of a flow battery containing an electrochemical cell stack with inlet and outlet manifolds that are fluidically connected to alternating half-cells. Since FIG. 6 lacks an insert in the outflow channel, the flow battery configuration of FIG. 6 is considered to be representative of that of a conventional flow battery. In the interest of clarity, the inlet and outlet manifolds that are fluidically connected to the oppositely charged half-cells of the flow battery are not depicted. Similarly, FIG. 6 omits some of the structural details shown in the preceding FIGURES so that various configurations of the inlet and outlet manifolds can be better understood. For example, the block arrows in FIG. 6 show electrolyte solution circulating laterally through the half-cells, but it is to be recognized that, in more specific embodiments, the electrolyte solution can be introduced by way of the bipolar plate to accomplish such lateral circulation (see FIG. 3, for example). Furthermore, although FIG. 6 shows a single bipolar plate separating the individual electrochemical cells in the electrochemical cell stack, such as the configuration shown in FIG. 5, it is to be recognized that abutted bipolar plates, such as the configuration of FIG. 4, can be used similarly.

As shown in FIG. 6, flow battery 100 includes electrochemical cell stack 102, which contains a plurality of electrochemical cells that are separated by one or more bipolar plates (see FIGS. 4 and 5). Since no insert is present in FIG. 6, flow battery 100 contains no provisions for back pressure regulation in outlet manifold 106. Inlet manifold 104 and outlet manifold 106 respectively supply and withdraw electrolyte solution to and from either the positive or negative half-cells within electrochemical cell stack 102. Inlet manifold 104 contains inflow channel 105, and outlet manifold 106 contains outflow channel 107. As depicted in block arrows in FIG. 6, an electrolyte solution is introduced into inlet manifold 104 longitudinally with respect to the electrochemical cells of electrochemical cell stack 102 and is also withdrawn longitudinally from outlet manifold 106. Similarly, lateral circulation of the electrolyte solution through one type of half-cell within each electrochemical cell of electrochemical cell stack 102 is shown in block arrows in FIG. 6. In the interest of clarity, circulation of an electrolyte solution through the other type of half-cell within flow battery 100 is not shown but is understood to be present. As indicated above, the electrolyte solution can enter the given half-cells via flow channels in the bipolar plates, according to some embodiments (see FIG. 3).

In some embodiments, inlet manifold 104 and its associated inflow channel 105 and outlet manifold 106 and its associated outflow channel 107 can be contiguous with the components used to fabricate the various electrochemical cells of electrochemical cell stack 102. As explained above, various electrochemical cells can be fabricated using mass-produced components, which also serve to define a flow pathway for the electrolyte solution. As electrochemical cell stack 102 is fabricated by stacking the mass-produced components upon one another, inflow channel 105 and outflow channel 107 become defined adjacent to the electrically conductive elements of electrochemical cell stack 102. Commonly owned U.S. patent application Ser. No. 15/093,598, filed on Apr. 7, 2016 and incorporated herein by reference in its entirety, provides additional details concerning how an electrochemical cell stack can be fabricated from mass-produced components, as explained hereinafter.

Figure 7:
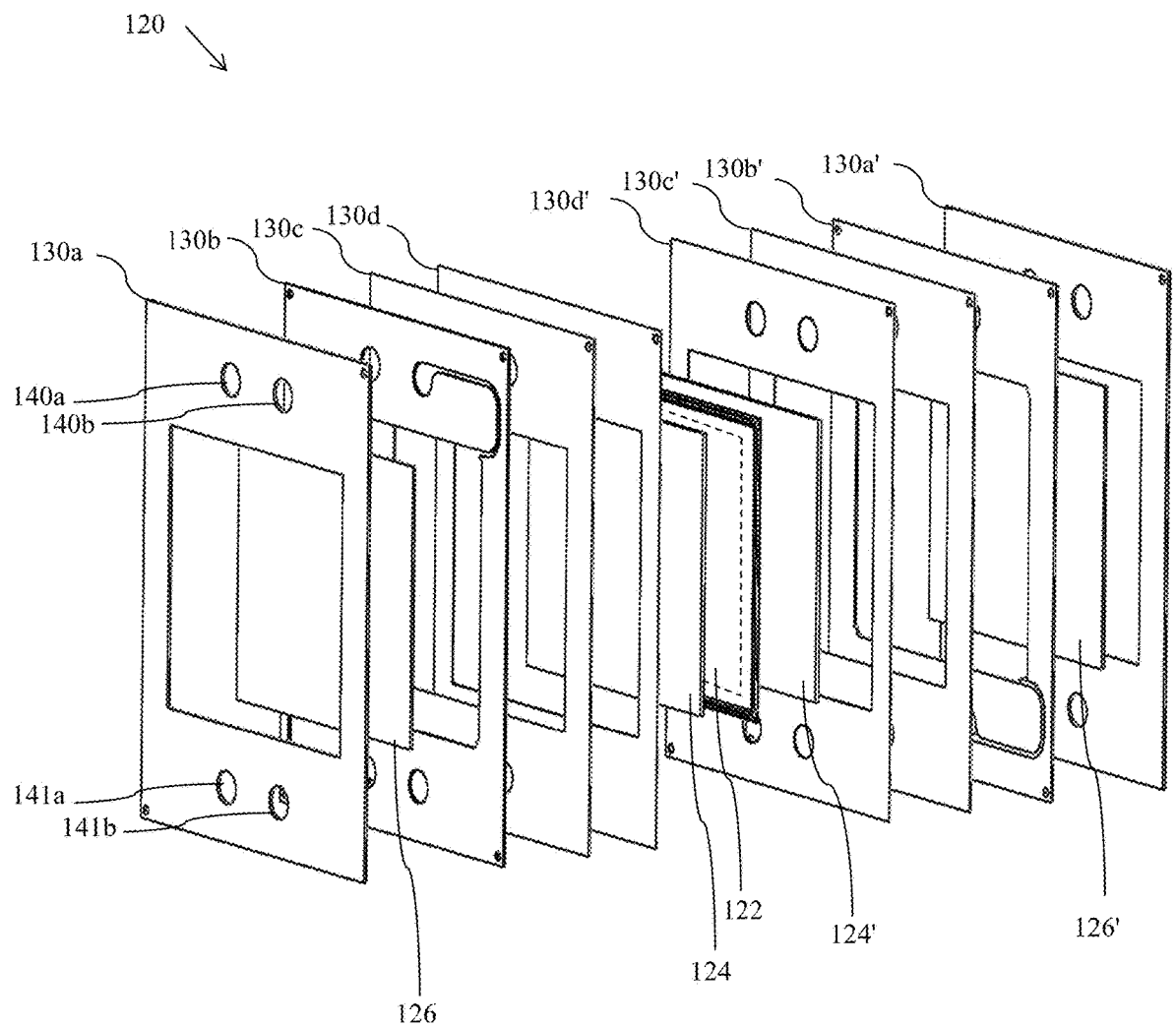
FIG. 7 shows an exploded view of an illustrative electrochemical cell fabricated from mass-produced components.

FIG. 7 shows an exploded view of an illustrative electrochemical cell 120 fabricated from mass-produced components. In brief, electrochemical cell 120 includes electrodes 124 and 124' disposed on opposing sides of separator 122, and bipolar plates 126 and 126' adjacent to electrodes 124 and 124', respectively. Various frame layers 130a-d and 130a'-d' promote distribution of electrolyte solution to bipolar plates 126 and 126' and electrodes 124 and 124' upon combining the layers together to define electrochemical cell 120. A plurality of electrochemical cells 120 can be combined to form an electrochemical cell stack (see FIGS. 3 and 4, for example). Frame layers 130a-d and 130a'-d' contain apertures 140a, 140b, 141a and 141b, which ultimately define the inflow and outflow channels that are in fluidic communication with each electrochemical cell. Specifically, a plurality of apertures 140a and 141a define an inflow channel and an outflow channel for one type of half-cell, and a plurality of apertures 140b and 141b define an inflow channel and an outflow channel for the other type of half-cell. As such, the resulting inflow and outflow channels are configured to promote lateral circulation through the electrochemical cells separately within each half-cell.

Referring again to FIG. 6, and as discussed further above, each of the electrochemical cells within electrochemical cell stack 102 experience different back pressures, which contribute to differential circulation rates in each electrochemical cell. Specifically, the electrochemical cell at the bottom of outflow channel 107 (i.e., the electrochemical cell most removed from the point of electrolyte solution withdrawal from outlet manifold 106) experiences a different back pressure than does the electrochemical cell at the top. In between, the back pressure varies between these two extremes. In addition, the electrolyte solution pressure on the inflow side of the electrochemical cells increases with increasing depth within inflow channel 106. In combination, the resulting pressure imbalance leads to different circulation rates of the electrolyte solution through each of the electrochemical cells.

As indicated above, the present inventors discovered a ready technique to combat this type of pressure imbalance, even when mass-produced cell components are used to fabricate repeating electrochemical cells of like structure in an electrochemical cell stack. Specifically, the present inventors discovered that placing an insert within an outflow channel of the electrochemical cell stack can variably regulate the back pressure experienced by an electrochemical cell in a particular longitudinal location. In order to produce a back pressure that varies longitudinally within the electrochemical cell stack, an insert having a variable width along a length of the outflow channel can be employed. In particular, the insert can be tapered along the length of the outflow channel, and structural aspects of the tapering can be further tailored to promote particular flow conditions in the outflow channel. In general, the width of the insert decreases in a direction configured for circulation of the electrolyte solution in the outflow channel.

Figure 8:
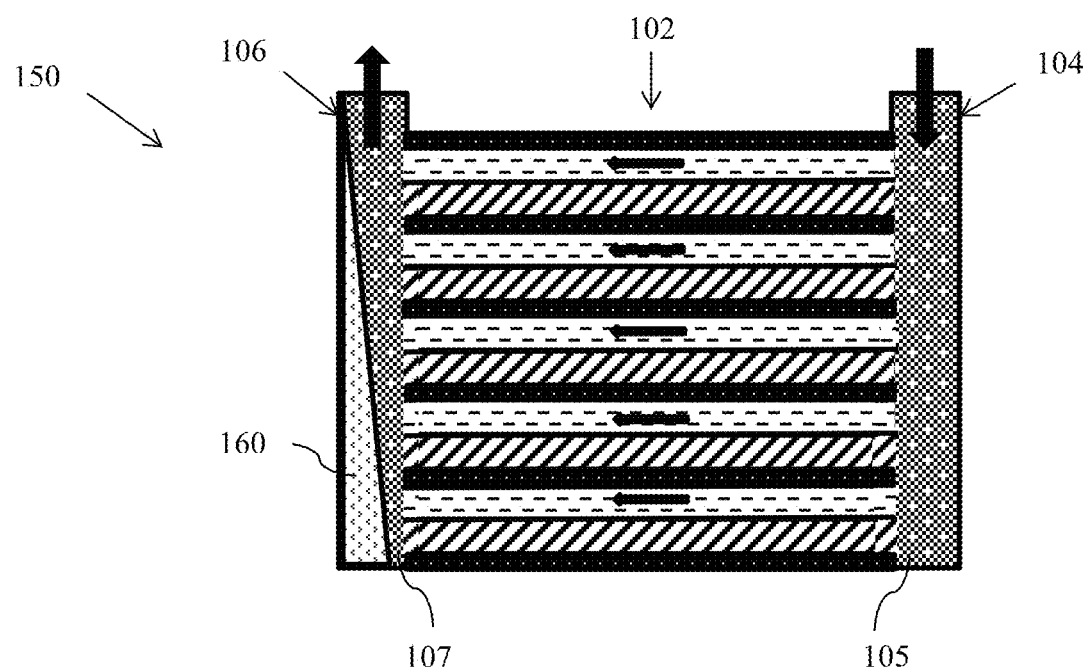
FIG. 8 shows an illustrative schematic of a flow battery containing an electrochemical cell stack with inlet and outlet manifolds that are fluidically connected to alternating half-cells and in which a variable width insert is disposed in the outlet manifold.

FIG. 8 shows an illustrative schematic of a flow battery containing an electrochemical cell stack with inlet and outlet manifolds that are fluidically connected to alternating half-cells and in which a variable width insert is disposed in the outlet manifold. Since the flow battery configuration of FIG. 8 is substantially similar to that of FIG. 6, except for the present of the variable width insert, common reference characters are used in these FIGURES to describe elements having similar structure and/or function. The variable width insert alters the pressure drop occurring through the height of the electrochemical cell stack, thereby levelizing the circulation rate of the electrolyte solution throughout the plurality of electrochemical cells.

Referring to FIG. 8, flow battery 150 includes electrochemical cell stack 102, inlet manifold 104 and outlet manifold 106. Within outflow channel 107 of outlet manifold 106 is disposed insert 160. Insert 160 is wider at locations that are farther removed from an outlet of outflow channel 107 (i.e., at the top of inlet manifold 106), thereby decreasing the area at the bottom of outflow channel 107 and increasing the back pressure exerted there. Conversely, since insert 160 decreases in area as it approaches the top of outflow channel 107, a smaller increase in back pressure occurs at this location under the influence of insert 160. The pitch of the tapering can be adjusted to promote a desired back pressure at each longitudinal position within outflow channel 107. Accordingly, the pitch and insert configuration depicted in FIG. 8 should not be considered limiting. For example, in alternative embodiments, insert 160 can have a curved surface, such as a parabolic or hyperbolic surface. In addition, insert 160 need not necessarily exhibit as constant change in width along the length of outflow channel 107, as depicted. For example, in some embodiments, a stepwise change in width can be effective, and in still other embodiments, a first portion of the insert can be curved and a second portion of the insert can be linearly tapered.

In some embodiments, the insert can be a monolithic structure. Monolithic structures can oftentimes be manufactured in a relatively straightforward manner. Suitable manufacturing techniques for a monolithic insert can include milling, casting, 3-D printing and the like. In addition, monolithic structures can usually be introduced to the outflow channel rather easily.

In other embodiments, the insert can be assembled from a plurality of modular components, which are smaller in size than the insert. Assembly of the insert from modular components can be desirable, for example, for prototype testing before fabricating a more robust insert as a monolithic structure. In addition, assembly of the insert from a plurality of modular components can be desirable if the insert has a complicated structure that may be problematic to fabricate by typical manufacturing means. The modular components can be in the form of a "toolkit" that can enable production of a wide variety of inserts having a range of shapes.

In general, materials used for fabricating the inserts are not considered to be particularly limited. Suitable materials can include, for example, polymers, ceramics, glass, metals and carbon. Polymers can be especially desirable, since they are commonly used to fabricate a variety of components within the electrochemical cells of the electrochemical cell stack.

Still other optional features can also be present in various configurations of the insert. In various embodiments, suitable features that can also be incorporated on or within the insert can include, for example, turbulence inducers, a plurality of projecting hairs, flow channels, baffles, fins, and the like. Such optional features can also promote regulation of the electrolyte solution circulation rate in the outflow channel in a desired and configurable manner.

In some embodiments, the insert can be affixed within the outflow channel. Suitable attachment techniques for affixing the insert within the outflow channel can include, for example, adhesive bonding, melt bonding, welding, mechanical attachment, compression fitting, and the like. The particular technique chosen for affixing the insert within the outflow channel can depend upon the material forming the interior of the outflow channel, for example.

More desirably, however, the insert can be removably disposed within the outflow channel. By configuring the insert to be removable, much greater operational flexibility can be realized. For example, if the insert fails or no longer performs as expected, the insert can be replaced by a new insert that is configured differently. Similarly, a new insert can be employed if the circulation conditions within the components of the flow battery change with age or use. Regardless of the need for making a change within the electrochemical cell stack, a new insert can be placed within the outflow channel to facilitate new circulation conditions through the electrochemical cells.

Figure 9:
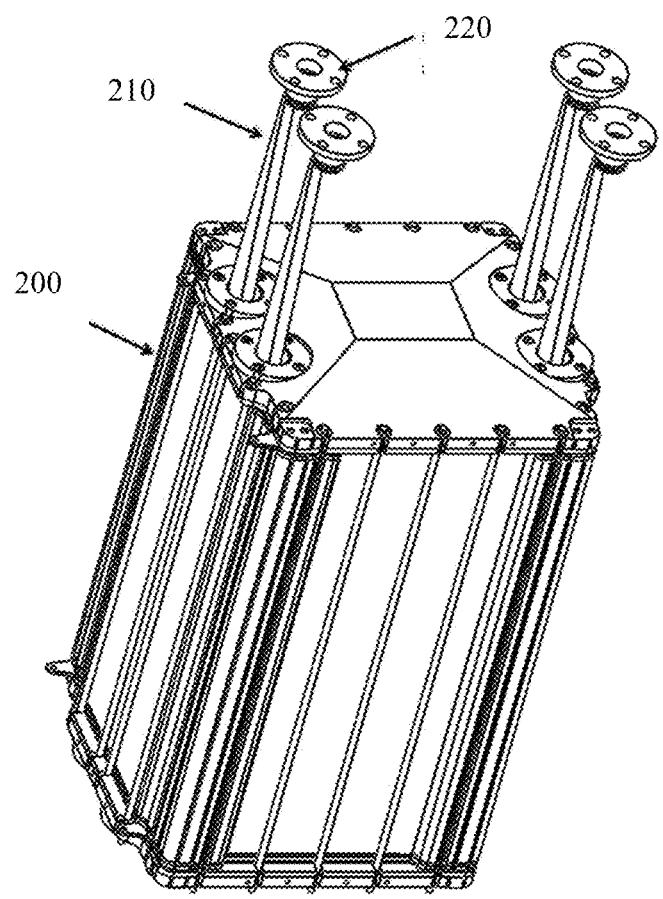
FIG. 9 shows an illustrative schematic of an illustrative electrochemical cell stack containing inserts affixed to pipe flanges.

In some embodiments, the insert can be affixed to a component contained with the balance of plant. Any component that is close enough to the outflow channel to promote introduction of the insert therein can be used. In particular embodiments, the balance of plant of a particular flow battery include a flange connected to an outlet of the outflow channel. The flange can help promote making a robust fluidic connection of a line leading to an electrolyte solution storage tank, for example. In specific embodiments, the insert can be affixed to the flange. Because the flange is located in such close proximity to the outflow channel, it can be particularly desirable to affix the insert to this component for disposition within the outflow channel. FIG. 9 shows an illustrative schematic of an illustrative electrochemical cell stack 200 containing inserts 210 affixed to flanges 220. Although FIG. 9 has shown inserts 210 within both the inflow channel and the outflow channel of electrochemical cell stack 200, it is to be recognized that the inserts 210 within the inflow channel can be omitted, so as to be consistent with the disclosure above. Further FIG. 9 shows the placement of separate inserts 210 for each of the electrolyte solutions circulating through electrochemical cell stack 200.

Each of the half-cells in the flow batteries of the present disclosure include an electrode. In more particular embodiments, one or both of the electrodes in the half-cells can be a carbon electrode, which can be formed from a carbon cloth or a carbon foam in some instances. Numerous examples of carbon cloths or carbon foams suitable for forming a carbon electrode will be familiar to one having ordinary skill in the art.

In some embodiments, flow batteries of the present disclosure can include an active material that is a coordination complex in one or more of the electrolyte solutions. As used herein, the terms "coordination complex," "coordination compound" and similar terms refer to any compound having a metal bound to one or more ligands through a covalent bond. Due to their variable oxidation states, transition metals can be highly desirable for use within the active materials of a flow battery system. Lanthanide metals can be used similarly in alternative embodiments. Cycling between the accessible oxidation states can result in the conversion of chemical energy into electrical energy. Especially desirable transition metals for inclusion in a flow battery include, for example, Al, Cr, Ti and Fe, particularly in the form of a coordination complex. For purposes of the present disclosure, Al is to be considered a transition metal. In some embodiments, coordination complexes within a flow battery can include at least one catecholate or substituted catecholate ligand.

Other ligands that can be present in coordination complexes, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, triazacyclononane, tris(hydroxymethyl)aminomethane, and the like.

In some embodiments, one or more of the active materials can be coordination complexes having a formula of $$D_gM(L_1)(L_2)(L_3),$$

wherein D is an alkali metal ion, an ammonium ion, a tetraalkylammonium ion, a phosphonium ion or any combination thereof, g is an integer or non-integer value ranging between 1 and 6, M is a transition metal or lanthanide metal, and $L_1$-$L_3$ are bidentate ligands, such as those defined hereinabove. The value of g can depend upon whether $L_1$-$L_3$ bear an ionic charge. In some embodiments, at least one of $L_1$-$L_3$ can be a catecholate ligand or substituted catecholate ligand, and in other embodiments, each of $L_1$-$L_3$ is a catecholate ligand or a substituted catecholate ligand. In some or other embodiments, M is Ti. In embodiments in which M is Ti and $L_1$-$L_3$ are uncharged catecholate ligands, g has a value of 2 to provide charge balance against titanium (IV).

In more particular embodiments, flow batteries of the present disclosure can include one or more aqueous electrolyte solutions. As used herein, the term "aqueous electrolyte solution" refers to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in an aqueous electrolyte solution include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $K^+$, $Mg^{2+}$, $Ca^{2+}$ and $Sr^{2+}$) and halides (e.g., $F^-$, $Cl^-$, or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries of the present disclosure can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof.

In some embodiments, flow batteries can include: a first chamber containing a negative electrode contacting a first aqueous electrolyte solution, a second chamber containing a positive electrode contacting a second aqueous electrolyte solution, and a separator disposed between the first and second aqueous electrolyte solutions. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in FIG. 1. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power. As discussed hereinabove, adjustment of the circulation rates can promote optimization of this process.

The separator can be a porous membrane in some embodiments and/or an ionomer membrane in other various embodiments. In some embodiments, the separator can be formed from an ionically conductive polymer. Regardless of its type, the separator or membrane can be ionically conductive toward various ions.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—CF=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm to 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 $mA/cm^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm². In further embodiments, suitable separators can include those in which the flow battery is capable of operating at a voltage efficiency of greater than 70%, greater than 80% or even greater than 90%.

The diffusion rate of the first and second active materials through the separator can be less than about $1 \times 10^{-5}$ mol cm$^{-2}$ day$^{-1}$, or less than about $1 \times 10^{-6}$ mol cm$^{-2}$ day$^{-1}$, or less than about $1 \times 10^{-7}$ mol cm$^{-2}$ day$^{-1}$, or less than about $1 \times 10^{-9}$ mol cm$^{-2}$ day$^{-1}$, or less than about $1 \times 10^{-11}$ mol cm$^{-2}$ day$^{-1}$, or less than about $1 \times 10^{-13}$ mol cm$^{-2}$ day$^{-1}$, or less than about $1 \times 10^{-15}$ mol cm$^{-2}$ day$^{-1}$.

The flow batteries can also include an external electrical circuit in electrical communication with the first and second electrodes. The electrical circuit can charge and discharge the flow battery during operation. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" refers to the amount of ions passing through the ionomer membrane, balancing the charge associated with the flow of external electricity/electrons. That is, the flow battery is capable of operating with the substantial exclusion of the active materials by the ionomer membrane, and such exclusion can be promoted through charge matching.

Flow batteries of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 μm, less than about 75 μm, less than about 50 μm, or less than about 250 μm; (f) where the flow battery is capable of operating at a current density of greater than about 100 mA/cm² with a round trip voltage efficiency of greater than about 60%; and (g) where the energy density of the electrolyte solutions is greater than about 10 Wh/L, greater than about 20 Wh/L, or greater than about 30 Wh/L.

In some cases, such as the embodiments discussed herein, a user may desire to provide higher charge or discharge voltages than are available from a single electrochemical cell. In such cases, several electrochemical cells can be connected in series such that the voltage of each cell is additive. This forms a bipolar stack, also referred to as an electrochemical cell stack herein. As discussed herein, a bipolar plate can be employed to connect adjacent electrochemical cells in a bipolar stack, which allows for electron transport to take place but prevents fluid or gas transport between adjacent cells. The positive electrode compartments and negative electrode compartments of individual electrochemical cells can be fluidically connected via inlet and outlet manifolds, as discussed herein. In this way, individual electrochemical cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping and pumps provide fluidic conductivity for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack); storage tanks and piping for containing and transporting the electrolyte solutions control hardware and software (which may include safety systems); and a power conditioning unit. The cell stack accomplishes the conversion of charging and discharging cycles and determines the peak power. The storage tanks contain the positive and negative active materials, and the tank volumes determine the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the enemy storage system or the application. For the example of an energy storage system connected to an electrical grid, in a charging cycle the power conditioning unit can convert, incoming AC electricity into DC electricity at an appropriate voltage and current for the cell stack, in a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Formula 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and [e⁻] is the concentration of electrons stored in the active material at 99% state of charge. In the case that the active materials largely are an atomic or molecular species for both the positive and negative electrolyte, [e⁻] can be calculated by Formula 2 as:

$$[e^-] = [\text{active materials}] \times N/2 \qquad (2)$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Formula 3:

$$\text{Charge density} = (26.8 \text{ A-h/mol}) \times [\text{active material}] \times N \qquad (3)$$

where [active material] and n are as defined above.

As used herein, the term "current density" refers to the total current passed in an electrochemical cell divided by the geometric area of the electrodes of the cell and is commonly reported in units of mA/cm².

As used herein, the term "current efficiency" ($I_{eff}$) is the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" is the ratio of the observed electrode potential, at a given current density, to the half cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using Formula 4:

$$V_{eff,RT} = V_{discharge}/V_{charge} \times 100\% \qquad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Having now described flow batteries of the present disclosure in some detail, illustrative methods for operating the flow batteries to provide improved efficiency values will now be described.

In various embodiments, methods for regulating an electrolyte solution circulation rate in a flow battery can include: providing a flow battery containing: an electrochemical cell stack containing a plurality of electrochemical cells in electrical communication with one another, an inlet manifold containing an inflow channel fluidically connected to an inflow side of each of the electrochemical cells, and an outlet manifold containing an outflow channel fluidically connected to an outflow side of each of the electrochemical cells; placing an insert in the outflow channel, and circulating an electrolyte solution through the electrochemical cell stack via the inlet manifold and the outlet manifold. The insert has a variable width along a length of the outflow channel. Particular configurations and dispositions of the insert are discussed in more detail hereinabove.

In more particular embodiments, circulating the electrolyte solution through the electrochemical cell stack can include: supplying the electrolyte solution to the inflow channel longitudinally with respect to the plurality of electrochemical cells, circulating the electrolyte solution laterally through the plurality of electrochemical cells, and withdrawing the electrolyte solution from the outflow channel longitudinally with respect to the plurality of electrochemical cells. Still more particularly, the electrolyte solution can be supplied longitudinally and withdrawn longitudinally via the inlet manifold and the outlet manifold, respectively, from a single face of the electrochemical cell stack.

When the insert is properly configured, the insert can levelize a circulation rate of the electrolyte solution through each of the electrochemical cells. As used herein, the term "levelize" refers to the condition of being made more uniform, particularly the condition of making electrolyte circulation rates more uniform. In particular embodiments, a levelized circulation rate is such that circulation rates through each of the electrochemical cells varies by less than about 5%, or less than about 2%, or less than about 1%, or less than 0.5%, or less than 0.25%, or less than 0.1%.

Figure 10:
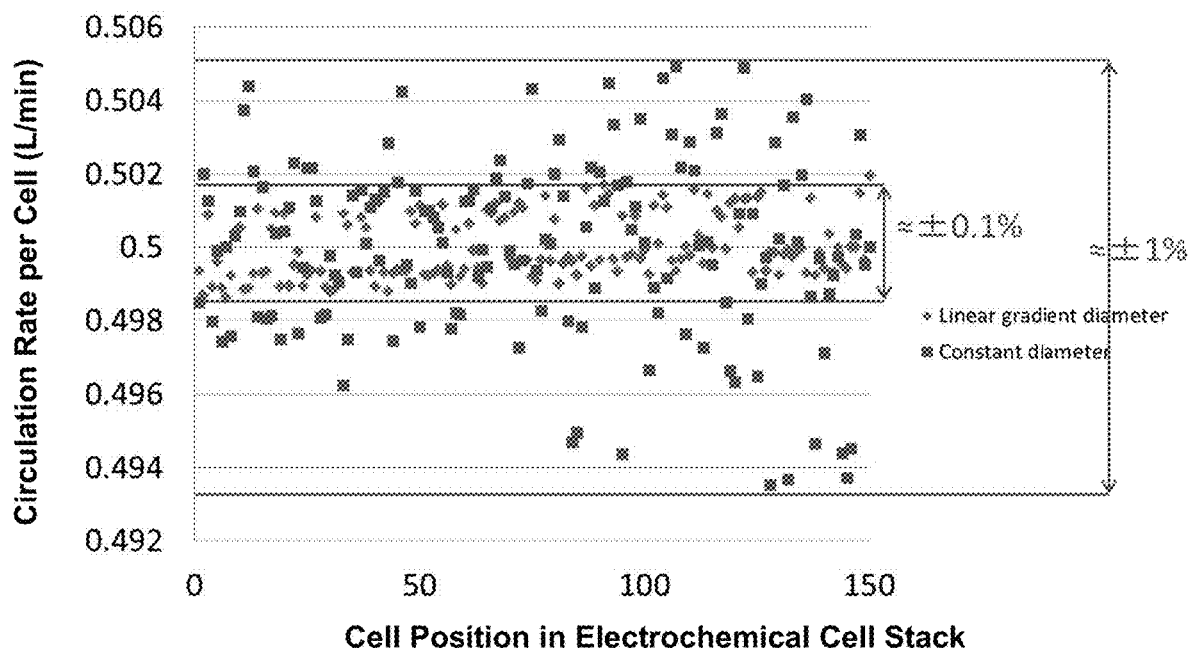
FIG. 10 shows a graph illustrating modeling of circulation rates through the individual electrochemical cells of an electrochemical cell stack when an insert is present versus when it is not.
Figure 11:
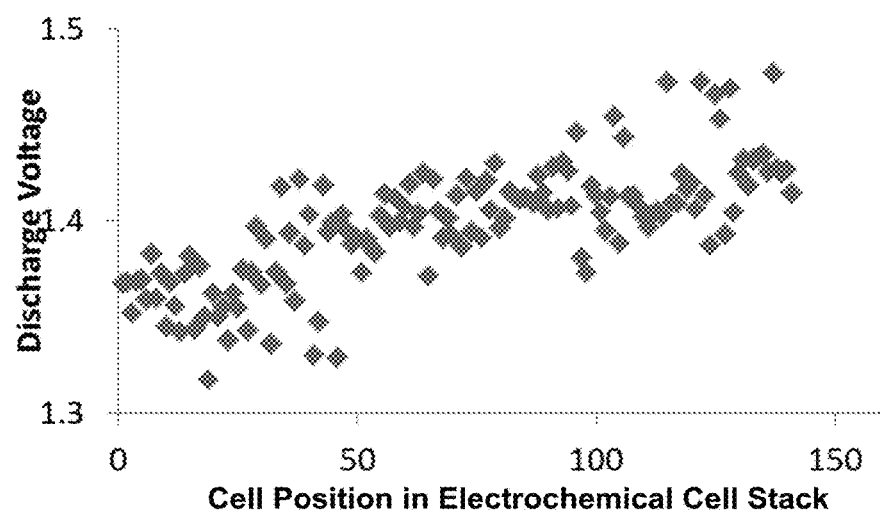
FIG. 11 shows a graph illustrating experimental discharge voltages for individual electrochemical cells within an electrochemical cell stack as a function of position, in which an insert is not present.

FIG. 10 shows a graph illustrating modeling of circulation rates through the individual electrochemical cells of an electrochemical cell stack when an insert is present versus when it is not. As shown in FIG. 10, the circulation rate variance is up to about ±1% when an insert is not present. In contrast, when a linearly tapered insert is present in the outflow channel, the electrolyte solution circulation rates were much more tightly clustered within a circulation rate variance of about ±0.1%. As shown, the circulation rate variance can become greater at cell positions located deeper in the electrochemical cell stack. FIG. 11 shows a graph illustrating experimental discharge voltages for individual electrochemical cells within an electrochemical cell stack as a function of position, in which an insert is not present. The variance in discharge voltages demonstrates the issues associated with varying circulation rates within a flow battery system. In particular, individual electrochemical cells having a lower circulation rate therein operate with a lower discharge voltage, since less active material is present over a given time interval.

As indicated above, methods of the present disclosure can also further include removing the insert from the outflow channel. Removal of the insert can be conducted, for example, when the insert has failed or the circulation conditions provided by the insert needed to be adjusted. Accordingly, in further embodiments, the insert disposed in the outflow channel is a first insert and induces a first flow condition of the electrolyte solution in the outflow channel, and the methods of the present disclosure can include removing the first insert from the outflow channel, and inducing a second flow condition of the electrolyte solution in the outflow channel by placing a second insert in the outflow channel, where the second insert is configured differently than the first insert.

In still other more specific embodiments, the insert can be affixed to flange that is operably connected to an outlet of the outflow channel, in which case placing the insert in the outflow channel includes connecting the flange to the outlet of the outflow channel. Additional details in this regard are provided hereinabove.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery comprising:
   an electrochemical cell stack comprising a plurality of electrochemical cells in electrical communication with one another, each electrochemical cell is configured to circulate electrolyte solution laterally therethrough;
   an inlet manifold comprising an inflow channel having a length that is substantially constant in width and cross-section along the length and fluidically connected to an inflow side of each of the plurality of electrochemical cells and positioned longitudinally with respect to the plurality of electrochemical cells, the inflow channel being configured to supply electrolyte solution to the plurality of electrochemical cells;
   an outlet manifold having a length, and comprising an outflow channel fluidically connected to an outflow side of each of the plurality of electrochemical cells and positioned longitudinally with respect to the plurality of electrochemical cells, the outflow channel being configured to withdraw electrolyte solution from the plurality of electrochemical cells through the outlet manifold and out an outlet at one end of the outflow channel; and
   an insert disposed in the outflow channel, the insert having a variable width along a length of the outflow channel, the insert having larger widths at locations in the outflow channel that are more removed from the outlet and smaller widths at locations nearer the outlet at the one end of the outflow channel.

2. The flow battery of claim 1, wherein the inlet manifold and the outlet manifold are configured, respectively, to supply and withdraw electrolyte solution longitudinally from a single face of the electrochemical cell stack.

3. The flow battery of claim 1, wherein the insert is tapered along the length of the outflow channel, and a width of the insert decreases in a direction configured for circulation of the electrolyte solution in the outflow channel.

4. The flow battery of claim 1, wherein the insert is removably disposed within the outflow channel.

5. The flow battery of claim 1, wherein the insert is affixed within the outflow channel.

6. The flow battery of claim 1, further comprising a flange operably connected to the outlet of the outflow channel, wherein the insert is affixed to the flange.

7. The flow battery of claim 1, wherein a first portion of the insert is curved, and a second portion of the insert is linearly tapered.

8. The flow battery of claim 1, wherein the insert further comprises a turbulence inducer, a plurality of projecting hairs, a flow channel, a baffle, a fin, or any combination thereof.

* * * * *